United States Patent [19]

Blevins et al.

[11] Patent Number: 5,203,393
[45] Date of Patent: Apr. 20, 1993

[54] AWNING SUPPORT RIBS

[76] Inventors: Timothy D. Blevins; Donald E. Blevins, both of P.O. Box 1088, Rockwell, Tex. 75087

[21] Appl. No.: 894,636

[22] Filed: Jun. 5, 1992

Related U.S. Application Data

[63] Continuation-in-part of Ser. No. 690,263, Apr. 24, 1991, abandoned.

[51] Int. Cl.$^5$ .............................................. E04F 10/06
[52] U.S. Cl. ........................................ 160/67; 160/64; 248/354.5; 135/89
[58] Field of Search ...................... 160/67, 65, 64, 76, 160/75, 372, 374; 248/354.4, 354.5, 295.1, 298, 172; 135/89; 114/361

[56] References Cited

U.S. PATENT DOCUMENTS

| | | | |
|---|---|---|---|
| 3,226,066 | 12/1965 | Folb | 114/361 X |
| 3,324,869 | 6/1967 | Duda | 135/89 |
| 3,356,329 | 12/1967 | Santo | 248/354.5 X |
| 3,918,510 | 11/1975 | Hayward | 160/45 |
| 3,980,121 | 9/1976 | McKee | 160/71 |
| 4,075,723 | 2/1978 | Bareis et al. | 114/361 |
| 4,171,013 | 10/1979 | Clark | 160/22 |
| 4,640,332 | 2/1987 | Turner | 160/46 |
| 4,801,119 | 1/1989 | Pelletier | 248/354.5 |
| 5,026,109 | 6/1991 | Merlot, Jr. | 160/84.1 |

FOREIGN PATENT DOCUMENTS

298363 10/1928 United Kingdom ............. 248/354.5

Primary Examiner—Blair M. Johnson
Attorney, Agent, or Firm—Richard C. Litman

[57] ABSTRACT

In an awning such as a house trailer or recreational vehicle awning, plural ribs are disposed against the underside of the awning. The ribs run transversely from the wall to the tube which supports the outboard end of the awning; this tube is horizontal, and parallel to the wall. The ribs are flexible, and slightly longer than the distance from the wall to the tube. When the ribs are put into place they acquire an upward bow, which crowns the surface of the awning. This encourages water runoff, decreases wind flapping, and improves appearance. Each rib has two parts for length adjustment. One part has an integral clamp to hold the other part in a fixed position; when the clamp is loosened the two parts can slide relatively. To hold the ribs in position various means may be used, including rib end pockets on the awning, straps, and fingers on one rib end mating with holes in the tube surface. The clamp may have a stiffening element attached by screws, and has an opening at each longitudinal end into which is inserted a projection on one end of a truss bar. The other end of the truss bar is attached to a rib by a truss knob to provide additional strength to the rib. In a second embodiment a slidable and lockable bracket mounted on a track pivotally holds one end of a rib having a circular cross-section, the other end of the rib being attached the tube.

10 Claims, 4 Drawing Sheets

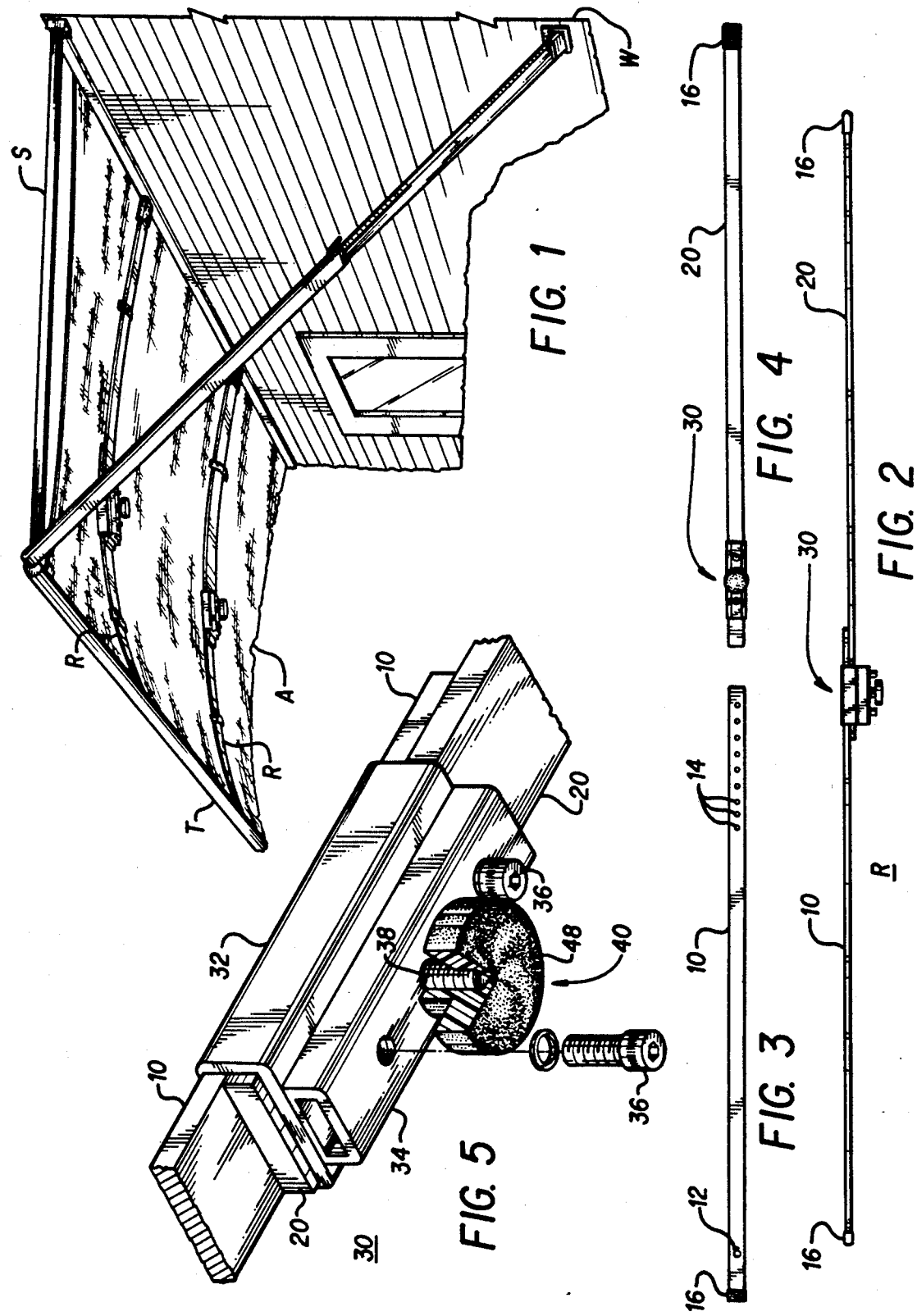

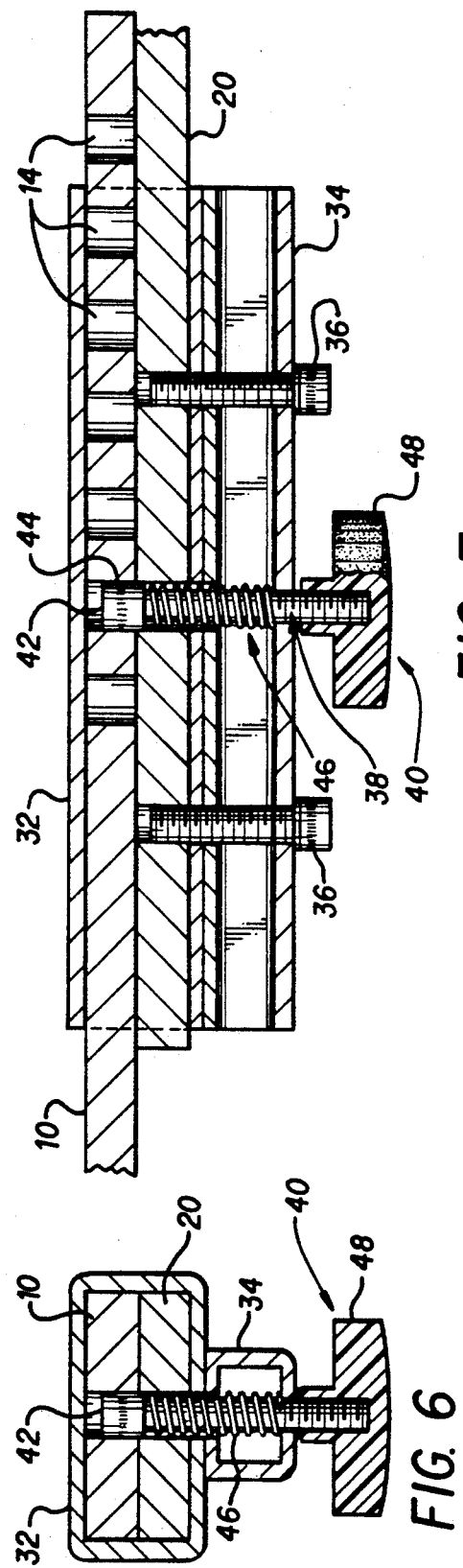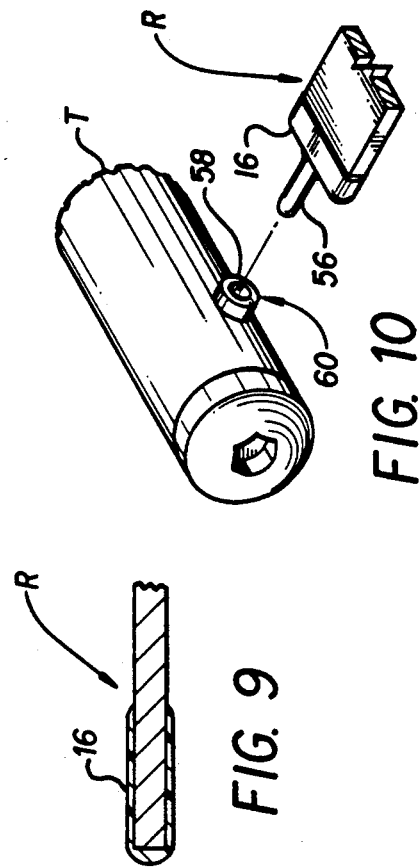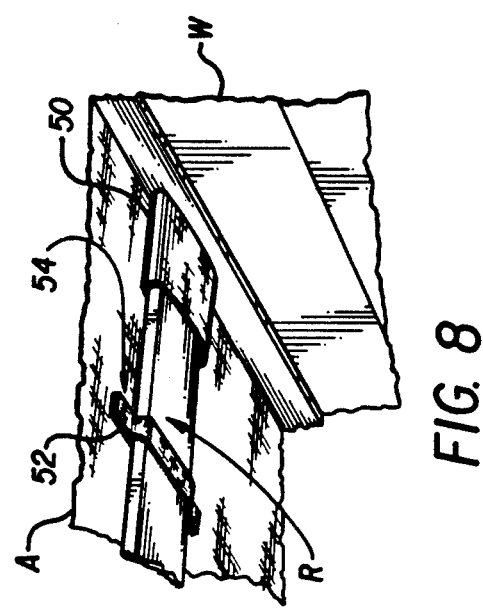

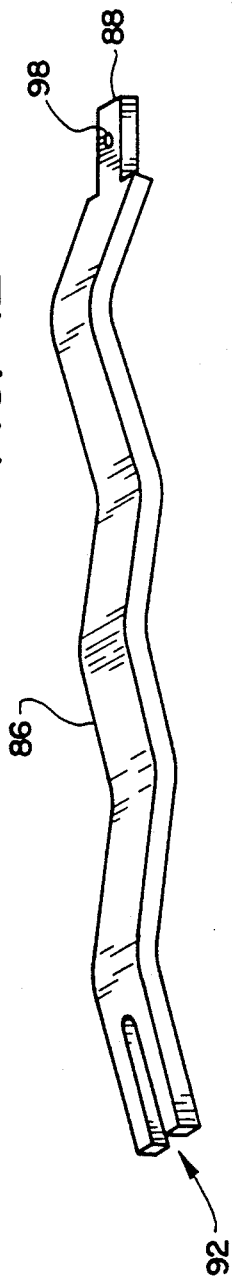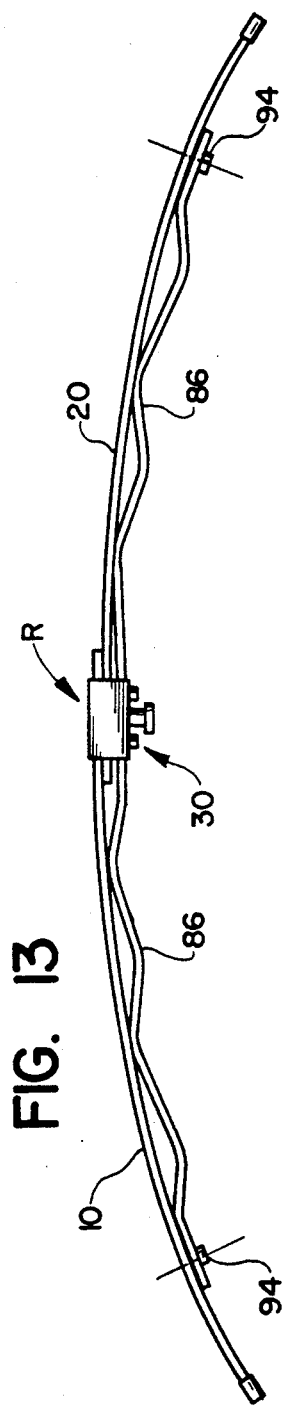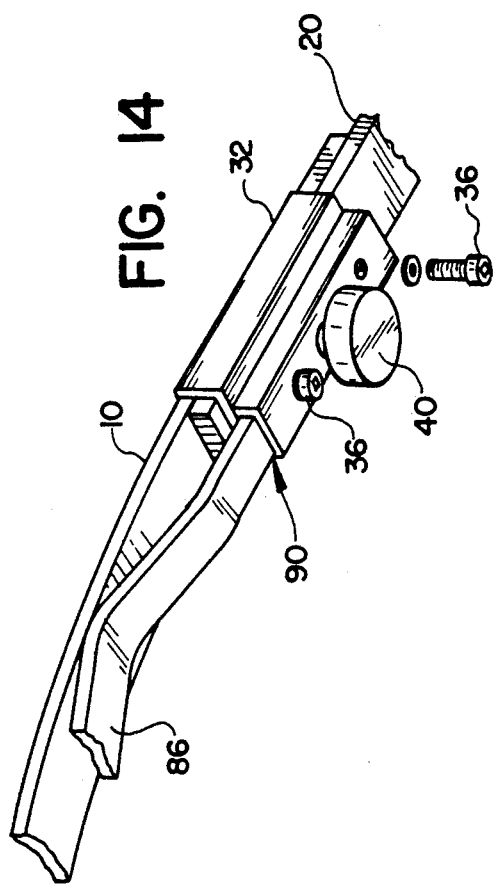

AWNING SUPPORT RIBS

RELATED APPLICATION

This application is a continuation-in-part of application Ser. No. 07/690,263 filed Apr. 24, 1991 now abandoned.

1. FIELD OF THE INVENTION

The present invention relates to awnings of fabric or other supple material which are mounted on rigid frames, especially house trailer and recreational vehicle awnings. More particularly, this invention involves the provision of bowed ribs to support the fabric or other supple material so as to prevent the accumulation of water and other debris on the top side of the awning. Also provided are strengthening trusses which may be attached to the ribs in instances where stronger awning support is needed or desired. It is contemplated that the ribs and trusses may be provided as original equipment in combination with the awning as manufactured, or as an add on kit to support awnings already mounted, for example, on the side of RV or recreational vehicles.

2. DESCRIPTION OF THE PRIOR ART

Awnings today are less widely used on buildings than they previously were, but are a very common accessory for house trailers and recreational vehicles. A house trailer or recreational vehicle usually lacks any sort of porch roof or other outside shade, but is much in need of such an overhead cover for rain and sun protection.

This need has led to various designs for stow-away awnings that will fit on the side of a house trailer or recreational vehicle to provide cover when opened, and also store compactly and securely. The most common design uses a roller tube around which the awning is wrapped when not in use. Typical designs are shown in U.S. Pat. Nos. 3,918,510 issued to Hayward, and 3,980,121 of McKee.

The frame structure of these stowable awnings is prismatic. A support tube (usually the roller tube) is held parallel to the trailer side, and horizontally, by four struts. Two struts are attached at either end. The two struts, together with the trailer wall, form a triangle with the roller attached to one corner. See, for example, the triangular strut arrangements disclosed by U.S. Pat. No. 3,324,869 issued to Duda, and U.S. Pat. No. 3,356,329 issued to Santo.

Medial struts are not generally used because the awning fabric rolls onto the roller tube, and struts anywhere but at the ends would interfere with the rolling process. The roller tubes are therefore rather long, and can suffer from weakness and bending inward. If the roller tube bows inward, the awning fabric will sag, and water will collect in pockets. The sagging is also unsightly. Several inventions deal with this problem of awning sag.

Turner, in U.S. Pat. No. 4,640,332, shows a trailer with an awning stretched between the trailer wall and a long support tube 30 which runs parallel to the wall. The tube 30 is supported only at its ends (by triangulating struts), but holds the weight of the awning, which tends to make it bow. A compression member 36 exerts outward force on the awning support tube 30 to prevent it from bowing inward. The outward force of the member 36 prevents bowing of the support tube and keeps the awning taut. Turner's member runs directly under the awning.

A similar member is used by Pelletier, as disclosed in U.S. Pat. No. 4,801,119. In this invention, though, the member is horizontal and perpendicular to the wall from which it runs, and also to the support tube. The member runs some distance beneath the awning, which inclines down from the wall to the support tube, and so does not contact it.

Clark, in U.S. Pat. No. 4,171,013, shows a system of two struts which hold up an awning. One strut runs directly under the awning on a diagonal, and thus provides some support.

Bowed ribs per se are of course well known. However, they have not been used to support awnings mounted on the side of recreational vehicles. Representative examples of bowed ribs are shown, for example only, in U.S. Pat. No. 3,226,066 issued to Folb, and U.S. Pat. No. 4,075,723 issued to Bareis et al. Similarly, spring biased locking bolts are disclosed to be conventional by British Patent No. 298,363 published Oct. 11, 1928.

None of the above inventions and patents, taken either singly or in combination, is seen to describe the instant invention as claimed.

The awnings known in prior art have not solved the problem of slackness in the awning fabric, and therefore present a sloppy appearance. Slackness also causes flapping of the awning in winds, which leads to noise and accelerated wear on the fabric. It also encourages rain puddles to form in the middle of large unsupported awning regions. Puddles can become quite large, because the water in them causes greater sagging, which causes more water to collect, and so on in a vicious cycle. The weight may become great enough to collapse the supporting frame. The fabric in any unsupported area will form rain pockets, especially at one end of the awning, unless the awning is steeply sloped or the areas are quite small.

The extra struts or compression members described in the prior art do not address this problem fully. They act only on the tube, and leave the fabric itself unsupported. Even if the extra strut runs right under the fabric, it only supports the fabric along one line. Instead of one rain pocket, there will be two—not a great improvement. Flapping in the wind is not substantially reduced by these struts. Also, these prior art struts are strong, complex devices for exerting large compression forces and are more complex than is needed for dealing with the problems of awning sag. They are not adaptable to a variety of awning frames. Being large and bulky, they are difficult to store.

Accordingly, one object of the present invention is a system of awning supports which eliminates sagging.

Another object of the present invention is a system of awning supports which is easily stored in a small, compact bundle or in a tube.

Still another object of the present invention is a system of awning supports adaptable to many sorts of awnings and awning frames.

A further object of the present invention is a system of awning supports which protects the awning by lifting the awning material out of the path of opening doors and screens whose edges can cut the material.

A final object of the present invention is an easily installed and removed awning support system.

These and other objects of the present invention will become readily apparent upon further review of the following specification and drawings.

SUMMARY OF THE INVENTION

The present invention is a system of battens or ribs, for use with an awning such as a house trailer or recreational vehicle awning. Plural ribs are disposed against the underside of the awning fabric. The ribs run transversely from the wall to the tube which supports the outboard end of the awning fabric; this tube is horizontal, and parallel to the wall.

The ribs are flexible, and slightly longer than the distance from the wall to the tube. When the ribs are put into place they acquire an upward bow, which crowns the surface of the awning fabric. This decreases wind flapping, improves appearance, and encourages water runoff, eliminating the need to lower one end of the awning to drain the water.

In one embodiment each rib is flat and has two parts for length adjustment. One part has an integral clamp to hold the other part in a fixed position; when the clamp is loosened the two parts can slide relatively to one another.

In another embodiment the ribs are round rods that swing out from brackets that slide along a track. The ribs store against the wall of the recreational vehicle when not in use.

To hold the ribs in position various means may be used, including rib end pockets on the awning, straps, and fingers on one rib end mating with holes in the tube surface.

In instances where a stronger support is needed or desired, a truss system configured to be attached to the ribs is provided. The truss system comprises two truss bars each having a projection at one end which is inserted in an opening provided in a stiffening element connected to the clamp holding the two rib parts in a fixed position. The other end of each truss bar is bifurcated to adjustably receive a truss knob engaged in a threaded hole located near an outer end of each rib part.

BRIEF DESCRIPTION OF THE DRAWINGS

FIG. 1 is an environmental perspective view of the ribs of the present invention in use, disposed over the underside of an awning. A wall, roller tube, and bracing struts are also shown.

FIG. 2 is an elevation view showing an assembled rib.

FIG. 3 is a plan view (from below) of the slide bar portion of the rib.

FIG. 4 is a plan view (from below) of the clamp bar portion of the rib.

FIG. 5 is a perspective view of the clamp of the clamp bar.

FIG. 6 is a cross section of the clamp across the length of the rib.

FIG. 7 is a cross section of the clamp along the length of the rib.

FIG. 8 is a detail of the awning pocket which holds the outer end of the rib adjacent the wall.

FIG. 9 is a cross section showing the plastic coating on the rib outer end.

FIG. 10 shows a structure for attaching the rib to the tube.

FIG. 12 is a perspective view of a truss bar.

FIG. 13 is a side view of two truss bars mounted on a rib.

FIG. 14 is a perspective cross-section view showing the attachment of the projection portions of the truss bars to the stiffening element mounted on the clamp connecting the slide bar and clamp bar of a rib.

Similar reference characters denote corresponding features consistently throughout the attached drawings.

DETAILED DESCRIPTION OF THE PREFERRED EMBODIMENTS

Figure 11:
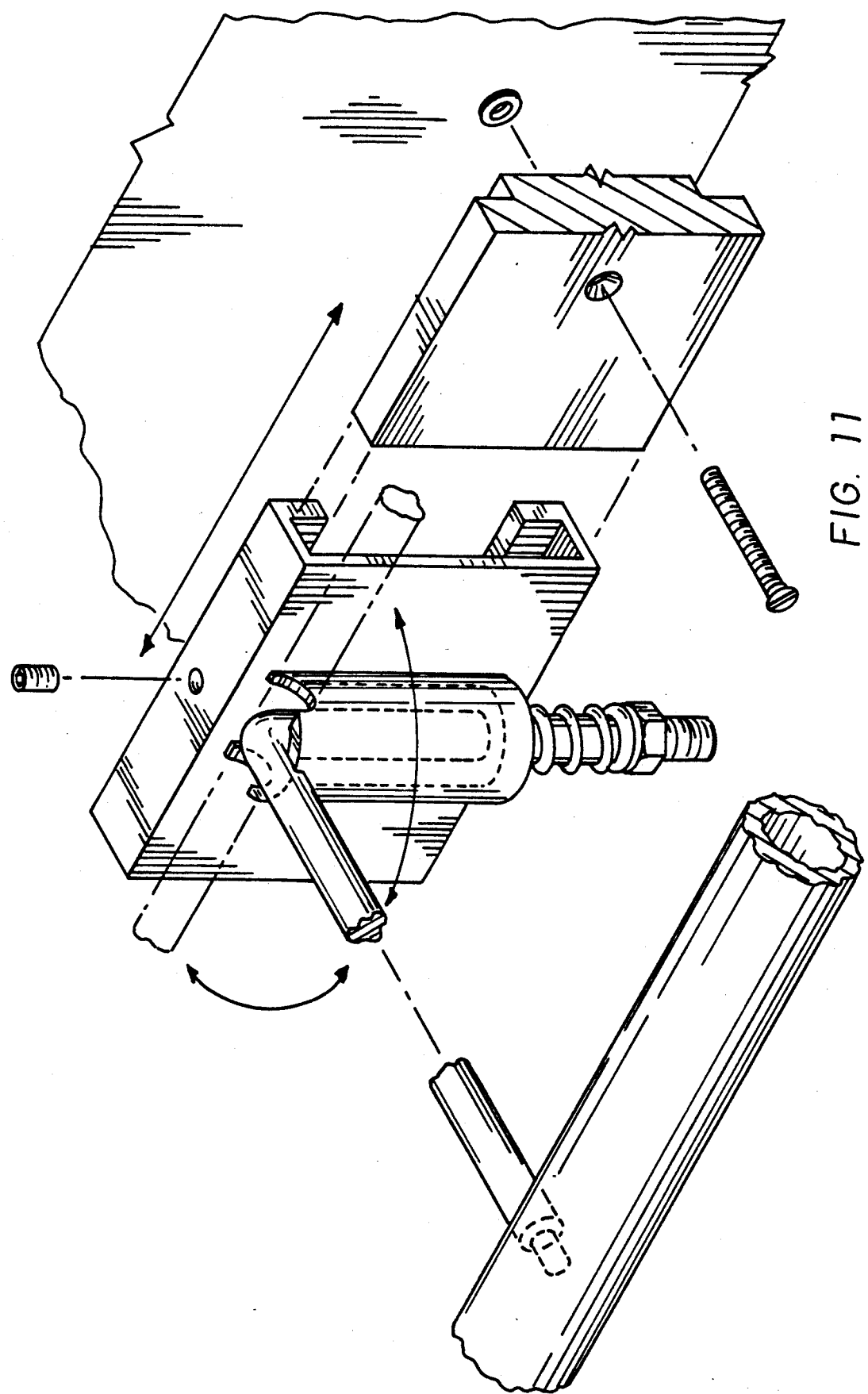
FIG. 11 shows the second embodiment of the invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not limitation.

The present invention is shown in use in FIG. 1. Two of the ribs R are shown disposed over the underside of the expanse of awning sheet material, the awning proper, denoted by A. The awning A is supported in space by attachment to a wall W and a horizontal support tube T. The tube T normally will run parallel to the wall W and be horizontal. The ribs R are equally spaced and are generally perpendicular to the wall W. The tube T is held in place by struts S. Along with the wall W, the struts S form a triangle. The end of the tube T is held at one corner of this triangle. The other end of the tube T (not shown) is held by an identical, or mirror image, set of struts. Thus the awning A is held by the tube T and the tube T is held at its ends by the struts S.

The support tube T is often a roller tube, which is rotatable in bearings on the struts S. The awning A is fastened to it, and wraps about the tube T as it revolves. This is convenient for storage, and is nearly universal on travel trailer and recreational vehicle awnings.

In this specification and claims the element T may be referred to as a roller tube or support tube. The element name is not to be construed as limiting the invention to awning frames which use rotating tubes, or to tubes as opposed to bars, I beams, or any other straight support element.

As can be seen in FIG. 1, the ribs R are curved when in use and in place. This curvature is due to compression of the ribs R when they are placed between the wall W and the Tube T. The ribs R are slightly longer than the distance between the Tube T and wall W, so that they must bow up or down. When installed, they are made to bow upward to crown the awning surface.

An unbowed, relaxed rib R is shown in FIG. 2. The rib R is composed of two separable sections, a slide bar 10 (shown by itself in FIG. 3) and a clamp bar 20 (shown by itself in FIG. 4). Both the slide bar 10 and clamp bar 20 are basically a length of stiff elastic material, such as a hardwood batten or 2-inch-wide aluminum bar stock. The cross section of the bar 10, 20 is preferably rectangular. The slide bar 10 and the clamp bar 20 are joined by the clamp 30 of the clamp bar 20. (The clamp 30, also shown in FIGS. 5, 6 and 7, will be discussed below.) Other parts of the slide bar 10 are: the through holes 14, which interact with the clamp 30; the alignment pin 12, which inserts into one of the through holes 14 to hold two bars 10 aligned for stacking; and the rubber or plastic end cap 16 which protects the awning fabric and creates friction. Another cap 16 is on the outer end of the clamp bar 20.

The clamp 30 is shown in perspective overview in FIG. 5. The clamp 30 not only clamps the slide bar 10 to the clamp bar 20, but also acts as a guide or alignment jig to hold the slide bar 10 in sliding engagement with the clamp bar 20 when the clamp 30 proper is unclenched. To this end the clamp 30 includes a collar 32 made of hollow rectangular tubing which closely surrounds the two bars 10, 20, but has enough clearance to permit the slide bar 10 to slide within it. The clamp bar 20 is permanently fixed to the collar 32 by screws 36, which pass through holes 43 in stiffening element 34, through holes 37 in the side of the collar 32 and thread into tapped holes 39 in the clamp bar 20. The screws 36 also hold the stiffening element 34 which is provided to brace the collar 32 and support the locking bolt 40 which clamps the two bars 10, 20 together by inserting into one of the through holes 14 of the slide bar 10.

The locking bolt 40 comprises a screw (or bolt) 42, which might be a ¼-20 size socket head cap screw; a coil spring 46; and a knob 48 threaded onto the screw 42. The screw 42 passes through holes 38 in the stiffening element 34, so that as the knob 48 is pulled the screw 42 may enter into one of the through holes 14 in the slide bar 10. The spring 46 is disposed through holes 41, 38 in the collar and stiffening element 34, and surrounds the shaft of the screw 42. The spring 46 presses against the annular surface of the cap head 44 of the screw 42 and also against the inside of the stiffening element 34 adjacent the hole 38. The spring 46 thus urges the locking bolt 40 toward the slide bar 10 and keeps the cap head 44 in one of the through holes 14 to lock the slide bar 10 into a position. The slide bar 10 is released by pulling outward on the knob 48. When released, it will fall against the surface of the slide bar 10 under the urging of the spring 46, and fall into the first through hole 14 which comes into position.

The knob 48 is threaded onto the screw 42, and may be locked with an anaerobic adhesive such as LOC-TITE brand adhesive, epoxy, a set screw, or the like.

The locking bolt 40 is shown in FIGS. 6 and 7 in the locked position, with the cap head 44 inserted into a through hole 14, to prevent the slide bar 10 from sliding out of the collar 32.

In alternative embodiments, any other sort of lock or clamp could be used, which allows for adjustment of the length of the ribs R.

The adjustment is easily accomplished. While holding the locking bolt 40 out, the inner end of the slide bar 10 is inserted into the collar 32 and slid over the clamp bar 20 until a through hole 14 is positioned for locking bolt 40 insertion, whereupon the knob 48 is released to lock the slide bar 10. All of the ribs R will be similarly adjusted to have a common length, a length picked to give a suitable crown to the awning A.

To hold the ribs R transversely in their respective positions of use, any means may be used. The simplest means is friction. Since the ribs R are bowed and are pushing outward against the wall W and tube T, the ends may be secured against moving by rubber covers or end caps 16. The rubber caps 16, which have a high coefficient of friction, will have a high resistance to sideways displacement as they are forced against the wall W and tube T. The caps 16 may be separately molded and then placed onto the bar ends, or the ends may be dipped into liquid plastic of the type which solidifies when exposed to air. A cross section of a bar end with a cap 16 is shown in FIG. 9.

FIG. 8 shows other means of locating the outer end of the rib R which is forced against the wall W. A pocket or sock 50, formed perhaps of two squares of fabric sewn together on three sides, may be attached to the awning A by sewing, by glue, by double-sided tape, or by any other means. The rib end is simply inserted into the open end of the sock 50 to prevent sideways slippage.

FIG. 8 also shows VELCRO straps 52, 54 which can locate the middle parts of the ribs R. A strap 52 of one type (hook, or loop) of VELCRO is fastened to the awning fabric with one of the methods listed above for fastening the sock 50. A strap 54 of the other type can be put over the rib R to contact the complementary strap 52 on the awning A and hold the rib R in place.

FIG. 10 shows another structure for locating the rib end which contacts the tube T. A rod 56, approximately two inches long and ⅜ inch in diameter, is fixed to the end of one of the bars 10, 20 and extends longitudinally from the end of the bar 10, 20. The rod 56 may be welded on, or the bar 10, 20 may be cut away to leave the rod 56 as an integral extension of the bar material. The end may be covered with a plastic boot or cap 16, which can be conveniently done by dipping the end of the cut-down bar 10, 20 into a liquid which dries to plastic coating, for example, PLASTI-DIP brand HCF Hardcoat.

The rod 56 inserts into a catch hole 60 drilled into the tube T. The catch hole 60 is lined with a plastic in a brass or stainless steel collar or rim 58. This structure secures the rib R against any ordinary force.

The second embodiment of the present invention is shown in FIG. 11. In this embodiment the ribs R2 are not removed and stored when not in use, but are folded against the wall W.

A track 70 is fastened to the wall W. Screws 71 or other fasteners hold the track 70 to the wall W. The track 70 is configured to enable a plurality of brackets 74 to slide along the track 70; only one bracket 74 is shown in FIG. 11. A holder 76 is welded or other wise fastened onto the bracket 74. A rib R2, which is not flat but is rather round in cross section, is rotatably inserted into the holder 76.

A set screw 72 locks the bracket 74 to the track 70 to hold it in position.

The end portion 75 of the rib R2 is bent over at roughly 90 degrees to the main length of the rib R2. The end portion 75 is inserted into the holder 76, which includes a cylindrical bore 73 adapted to rotatably and slidably receive the end portion 75. The end portion 75 includes a threaded tip 80 onto which is threaded a nut 82. A coil spring 84 is disposed around the end portion 75 of the rib R2 between the nut 82 and the bottom of the holder 76. The spring 84 forces the rib R2 downward.

The downward force of the spring 84 pulls down that part of the main length of the rib R2 which is adjacent to the end portion 75 within the holder 76. The round material of the rib R2 is thus pulled into one of three notches 78 cut into the top of the holder 76. Because of the downward force, the rib R2 tends to stay within any one of the notches 78 in which it may be. The rib R2 may be easily rotated away from the notches 78, even if the spring 84 is quite stiff, because of the great leverage when the rib R2 is grasped farther out.

Two of the notches 78 are disposed in a line parallel to the track 70; when the rib R2 is in either of these, the rib R2 will be held parallel to the wall W. These are the storage positions.

If the rib R2 is allowed to fall into the third intermediate notch 78, it will stick straight out, at right angles to the wall W. This is the position of use.

The end of the rib R2 distal the track 70 will insert into the tube T as described above.

The brackets 74 may be disposed at various points along the track 70 to support the awning A as desired. They may also be moved to other positions at which the ribs R2 may be conveniently folded out of the way.

When a stronger support is needed or desired, a pair of truss bars similar to truss bar 86 shown in FIG. 12 are attached to each rib R as shown in FIGS. 13 and 14. Each truss bar 86 is provided with a projection 88 at one end which is configured to fit into an opening 90 in either end of stiffening element 34. The other end of the truss bar 86 is provided with an elongated longitudinal slot 92 which adjustably accommodates a truss knob 94 which screws into a threaded bore 96 provided near the outer end of slide bar 10 and clamp bar 20. Projection 88 on each truss bar 86 may also be provided with a bore 98 to accommodate the passage of a screw 36 which can serve to hold the projection end of truss bar 86 within opening 90, if found to be desirable.

Ribs R and R2 and truss bars 86 are formed of the same resilient materials although other materials may also be used. It is contemplated that Ribs R and R2 and truss bars 86 together with suitable mounting structure may be installed with the awning A in a factory setting, or may be provided separately as an add-on kit, for example, to RV owners who already have one or more awnings A attached to their vehicle.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

We claim:

1. An awning support apparatus comprising:
    an awning formed of supple sheet material connected to a wall and to a tube disposed parallel to said wall;
    a pair of side frames connected to and extending from said wall respectively along each side of said awning, and connected at an apex opposite to said wall to a respective end of said tube;
    said tube when connected to said pair of side frames being disposed a predetermined distance from said wall measured along said each side of said awning;
    at least one flexible, adjustable rib means located between said sides of said awning and extending between said wall and said tube, said at least one flexible, adjustable rib means being longer than said predetermined distance; and
    holding means engageable with said at least one flexible, adjustable rib means to hold said at least one flexible, adjustable rib means in an outwardly bowed condition in substantial contact with said awning material to thereby provide additional support for the awning material;
    said at least one flexible, adjustable rib means comprising an elongated slide bar having a rectangular cross section and a plurality of holes at one end and a first end cap provided at an opposite end, an elongated clamp bar having a rectangular cross section and a clamp mounted at one end and a second end cap provided at an opposite end, said clamp including a collar with an opening for receiving said one end of said slide bar, and a spring biased locking bolt engageable with one of said plurality of holes in said one end of said slide bar; whereby the length of said at least one flexible adjustable rib means may be changed to accommodate differently sized awnings, and sagging and flapping of the awning is substantially reduced particularly during inclement and windy weather conditions.

2. An awning support apparatus as in claim 1, including:
    a plurality of rib means and a plurality of holding means.

3. An awning support apparatus as in claim 1, wherein said holding means comprises:
    at least one pocket provided adjacent said wall for receiving one end of said at least one flexible, adjustable rib means;
    a rod provided at an end opposite said one end of said at least one flexible adjustable rib means;
    a catch hole provided on said tube, said rod being located in said catch hole; and
    hook and loop fasteners connected to said awning material to hold central portions of said at least one flexible, adjustable rib means in position on said awning material.

4. An awning support apparatus as in claim 3, said at least one flexible, adjustable rib means further comprising:
    a stiffening element connected to each said clamp, said stiffening element having an opening at each longitudinal end;
    at least one truss means connected to said stiffening element and to said slide bar and said clamp bar;
    said at least one truss means including two truss bars, each said truss bar having a projection at one end engageable with one of said end openings in said stiffening element;
    each said truss bar having an elongated longitudinal slot in an end opposite said one end having said projection, said elongated longitudinal slot engaging a truss knob threadably engaged in one of two threaded holes located one at each end of said at least one flexible, adjustable rib means; whereby said outwardly bowed condition of said at least one flexible, adjustable rib means is strengthened.

5. An awning support apparatus as in claim 4, wherein:
    said stiffening element is connected to said clamp by screws;
    each said projection on each said truss bar includes a bore therethrough; and
    each said truss bar being connected to said stiffening element by one of said screws passing through said bore.

6. An awning support apparatus for use with an awning having one end attached to a wall and a second end attached to a tube held a predetermined distance from said one end of said awning, measured along said awning, by a pair of side frames attached to said wall, said awning support apparatus comprising:

at least on flexible, adjustable rib means having a length longer than said predetermined distance; and holding means engageable with said at least one flexible, adjustable rib means to hold said at least one flexible, adjustable rib means in an outwardly bowed condition in substantial contact with said awning to thereby provide additional support for said awning;

said at least one flexible, adjustable rib means comprising an elongated slide bar having a rectangular cross section and a plurality of holes at one end and a first end cap provided at an opposite end, an elongated clamp bar having a rectangular cross section and a clamp mounted at one end and a second end cap provided at an opposite end, said clamp including a collar with an opening for receiving said one end of said slide bar, and a spring biased locking bolt engageable with one of said plurality of holes in said one end of said slide bar;

said awning support apparatus being provided in a kit form to be added to existing awning arrangements; whereby the length of said at least one flexible, adjustable rib means may be changed to accommodate differently sized awnings, and sagging and flapping of the awning is substantially reduced particularly during inclement and windy conditions.

7. An awning support apparatus as in claim 6, including:
   a plurality of rib means and a plurality of holding means.

8. An awning support apparatus as in claim 6, wherein said holding means comprises:
   at least one pocket to be located adjacent said wall for receiving one end of said at least one flexible adjustable rib means;
   a rod provided at an end of said at least on flexible adjustable rib means opposite said one end of said at least one flexible adjustable rib means, said rod being engageable with a catch hole provided on said tube; and
   hook and loop fasteners to be attached to said awning to hold central portions of said at least one flexible, adjustable rib means in position in engagement with said awning.

9. An awning support apparatus as in claim 6, said at least one flexible, adjustable rib means further comprising:
   a stiffening element connected to each said clamp, said stiffening element having an opening at each longitudinal end;
   at least one truss means connected to said stiffening element and to said slide bar and said clamp bar;
   said at least one truss means including two truss bars, each said truss bar having a projection at one end engageable with one of said end openings in said stiffening element;
   each said truss bar having an elongated longitudinal slot in an end opposite said one end having said projection, said elongated longitudinal slot engaging a truss knob threadably engaged in one of two threaded holes located one at each end of said at least one flexible, adjustable rib means; whereby
   said outwardly bowed condition of said at least one flexible, adjustable rib means is strengthened.

10. An awning support apparatus as in claim 9, wherein:
    said stiffening element is connected to said clamp by screws;
    each said projection on each said truss bar includes a bore therethrough; and
    each said truss bar being connected to said stiffening element by one of said screws passing through said bore.

* * * * *